(12) United States Patent
Pagliccia et al.

(10) Patent No.: US 12,122,514 B2
(45) Date of Patent: Oct. 22, 2024

(54) AIRBORNE PLATFORM COMPRISING AN ELECTRICAL CHARGING SYSTEM, RELATED ASSEMBLIES AND METHODS

(71) Applicant: TotalEnergies OneTech, Courbevoie (FR)

(72) Inventors: Bruno Pagliccia, Pau (FR); Pierre-Olivier Lys, Pau (FR); Paul Barbier, Pau (FR)

(73) Assignee: TotalEnergies OneTech, Courbevoie (FR)

( * ) Notice: Subject to any disclaimer, the term of this patent is extended or adjusted under 35 U.S.C. 154(b) by 5 days.

(21) Appl. No.: 17/909,021

(22) PCT Filed: Mar. 5, 2020

(86) PCT No.: PCT/IB2020/000462
§ 371 (c)(1),
(2) Date: Sep. 2, 2022

(87) PCT Pub. No.: WO2021/176248
PCT Pub. Date: Sep. 10, 2021

(65) Prior Publication Data
US 2023/0086129 A1    Mar. 23, 2023

(51) Int. Cl.
| | | |
|---|---|---|
| *B64U 50/34* | (2023.01) | |
| *B64B 1/22* | (2006.01) | |
| *B64C 39/02* | (2023.01) | |
| *B64D 1/02* | (2006.01) | |
| *B64D 27/24* | (2006.01) | |
| *G01V 3/16* | (2006.01) | |
| *B64U 10/13* | (2023.01) | |

(Continued)

(52) U.S. Cl.
CPC .............. *B64C 39/024* (2013.01); *B64B 1/22* (2013.01); *B64D 1/02* (2013.01); *B64D 27/24* (2013.01); *G01V 3/16* (2013.01); *B64U 10/13* (2023.01); *B64U 10/30* (2023.01); *B64U 50/19* (2023.01); *B64U 50/34* (2023.01); *B64U 70/20* (2023.01); *B64U 80/82* (2023.01); *B64U 2101/00* (2023.01)

(58) Field of Classification Search
CPC ... B64B 1/22; B64D 1/02; G01V 3/16; B64U 70/20; B64U 10/13; B64U 10/30; B64U 50/19; B64U 50/34; B64U 80/82; B64U 2101/00
See application file for complete search history.

(56) References Cited

U.S. PATENT DOCUMENTS 11,431,168 B2 *   8/2022  Syracuse .............. H02J 7/0044
2016/0364989 A1 * 12/2016  Speasl .................. G08G 5/0069
(Continued)

FOREIGN PATENT DOCUMENTS

| CN | 108891574 A | 11/2018 |
|---|---|---|
| CN | 109466759 A | 3/2019 |
| WO | 2018/224620 A1 | 12/2018 |

*Primary Examiner* — Tye William Abell
(74) *Attorney, Agent, or Firm* — TROUTMAN PEPPER HAMILTON SANDERS LLP (57) ABSTRACT

The invention relates to an airborne platform comprising a main body configured for flying over a region of interest and an electrical charging system fixed to the main body and located outside of the main body. The electrical charging system comprising at least one induction coil intended to remotely charge at least one battery of at least one apparatus.

21 Claims, 6 Drawing Sheets

(51) Int. Cl.
*B64U 10/30* (2023.01)
*B64U 50/19* (2023.01)
*B64U 70/20* (2023.01)
*B64U 80/82* (2023.01)
*B64U 101/00* (2023.01)

(56) References Cited

U.S. PATENT DOCUMENTS

2018/0095468 A1\* 4/2018 Yang ...................... B64D 27/24
2020/0183029 A1\* 6/2020 Clement ................ G01V 1/162

\* cited by examiner

AIRBORNE PLATFORM COMPRISING AN ELECTRICAL CHARGING SYSTEM, RELATED ASSEMBLIES AND METHODS

CROSS REFERENCE TO RELATED APPLICATION

The present application is a U.S. National Phase Application under 35 U.S.C. § 371 of International Patent Application No. PCT/IB2020/000462 filed Mar. 5, 2020. The entire contents of which are hereby incorporated by reference.

TECHNICAL FIELD

According to a first aspect, the invention relates to an airborne platform comprising a main body configured for flying over a region of interest.

The airborne platform is a manned airborne vehicle such as a plane or an airship. In variant, the airborne platform is an unmanned airborne vehicle.

The airborne platform is in particular intended to carry heavy payloads to remote locations with a difficult access, in particular regions in which access by road is tedious or impossible.

For example, such kind of airborne platforms is used in oil and gas exploration activities in a remote region of interest with a difficult access. The region in particular comprises a high density of vegetation, such as a forest, typically a tropical forest. In addition, the region of interest may comprise rugged terrain such as hills (for example foothills), cliffs and/or mountains, cold or hot desert areas, transition areas. The region may sometimes comprise dangerous to access areas, such as areas with unexploded ordinances (UXO's).

The region of interest is typically a vast area from one ten of square kilometers to one thousand of square kilometers.

BACKGROUND

For exploration purposes in such remote and tedious regions of interest, unmanned airborne vehicles may be used for dropping sensors over the region of interest. Each sensor is intended to be partially introduced into the ground by its own velocity, mass and deceleration thereupon its impact with the ground from the unmanned airborne vehicles.

Each sensor is in particular intended to form a receiver including at least a geophysical sensor to conduct a geophysical survey in the region of interest.

Geophysical measurements obtained during such a survey are critical for building a subsurface earth image representative of the particular geology in the region of interest, in particular to determine the location of potential reservoirs of oil and gas.

To obtain a subsurface image of good quality, this kind of geophysical survey requires numerous sensors, generally tens of thousands, to be dropped by tens of unmanned airborne vehicles.

The deployment of the sensors may take time since the unmanned airborne vehicles have a limited flying endurance, for example less than one hour, and then have to come back to a base camp in order their battery to be changed and/or charged.

In the meanwhile, before the beginning of the survey, the sensors already pegged in the ground or laid in the ground start to consume the energy from their own battery to maintain a standby state and/or communicate with a receiver located in the region of interest or in a base camp.

The autonomy of the sensors is also limited in time. As such kind of geophysical survey may last several weeks, any delay in the setting up of the survey may render some sensors useless.

One aim of the invention is to provide an airborne platform which allows accelerating the time to set up the seismic survey and improving the autonomy of the apparatus involved in the survey.

SUMMARY

To this aim, the subject-matter of the invention is an airborne platform comprising a main body configured for flying over a region of interest and an electrical charging system fixed to the main body and located outside of the main body, the electrical charging system comprising at least one induction coil intended to remotely charge at least one battery of at least one apparatus.

The airborne platform according to the invention may comprise one or more of the following features, taken solely, or according to any technical feasible combination:
  the induction coil is fixed below the main body along a first direction,
  the induction coil extends in a plane substantially perpendicular to the first direction,
  the induction coil is fixed to the main body by a plurality of slings,
  the electrical charging system comprises a power source fixed to the main body or to the induction coil for powering the induction coil,
  the apparatus is an unmanned airborne vehicle,
  the main body is an airship,
  the electrical charging system comprises a landing area for the unmanned airborne vehicle, said landing area being fixed to the induction coil,
  the electrical charging system comprises at least one hooking device, the hooking device being intended to hook the unmanned airborne vehicle to the electrical charging system,
  the unmanned airborne vehicle comprises a supporting device for carrying at least one sensor intended to be dropped from the unmanned airborne vehicle, the unmanned airborne vehicle further comprising a replenishing system intended to replenish the supporting device of the unmanned airborne vehicle with at least one sensor,
  the apparatus is a sensor intended to be pegged in a ground of the region of interest or laid on a ground of the region of interest,
  The airborne platform comprises a plurality of landing legs, the landing legs being intended to be in contact with the ground of the region of interest and to maintain the induction coil at a predetermined distance from the sensor,
  the electrical charging system comprises a framework fixed below the main body and intended to be in contact with the ground of the region of interest, the induction coil being fixed to the framework or embedded in the framework, the framework being intended to cover the sensor.

According to a second aspect, the invention relates to an assembly comprising:
  an airborne platform as described above,
  at least one apparatus comprising at least one battery.

The assembly, according to the invention, may comprise one or more of the following features, taken solely, or according to any technical feasible combination:
- the apparatus is an unmanned airborne vehicle further comprising an induction charger for charging the battery by interaction with the electrical charging system of the airborne platform,
- the apparatus is a sensor intended to be pegged in a ground of the region of interest, the sensor further comprising an induction charger for charging the battery by interaction with the electrical charging system of the airborne platform.

According to a third aspect, the invention relates to a method for charging a battery of an apparatus using an airborne platform the airborne platform comprising a main body and an electrical charging system fixed to the main body, the electrical charging system comprising at least one induction coil, the method comprising the following steps:
- flying the airborne platform over the region of interest,
- charging the battery of the apparatus using the induction coil.

The method according to the invention may comprise one or more of the following features, taken solely, or according to any technical feasible combination:
- the method comprises moving the airborne platform over the region of interest or maintaining the airborne platform in a hover flight over the region of interest,
- the apparatus is an unmanned airborne vehicle, the method comprising moving the unmanned airborne vehicle inside the induction coil or at a predetermined distance around the induction coil for charging the battery of the unmanned airborne vehicle,
- the method comprises maintaining of the unmanned airborne vehicle at a predetermined distance from the airborne platform,
- the apparatus is an unmanned airborne vehicle, the electrical charging system comprising a landing area fixed below the main body or below the induction coil, the method further comprising landing the unmanned airborne platform on the landing area before charging the battery of the unmanned airborne platform,
- the apparatus is an unmanned airborne vehicle, the electrical charging system comprising at least one hooking device, the method further comprises hooking the unmanned airborne vehicle to the hooking device before charging the battery of the unmanned airborne vehicle,
- The method comprises during the step for charging the battery of the unmanned airborne vehicle, replenishing the unmanned airborne vehicle with at least one sensor,
- the apparatus is a sensor pegged in the ground of the region of interest or laid on the region of interest, the method further comprising landing the airborne platform over the sensor or maintaining the airborne platform at a predetermined distance from the sensor.

BRIEF DESCRIPTION OF THE DRAWINGS

The invention will be better understood, upon reading of the following description, given solely as an example, and made in reference to the appended drawings, in which.

DETAILED DESCRIPTION OF EMBODIMENTS

Figure 1:
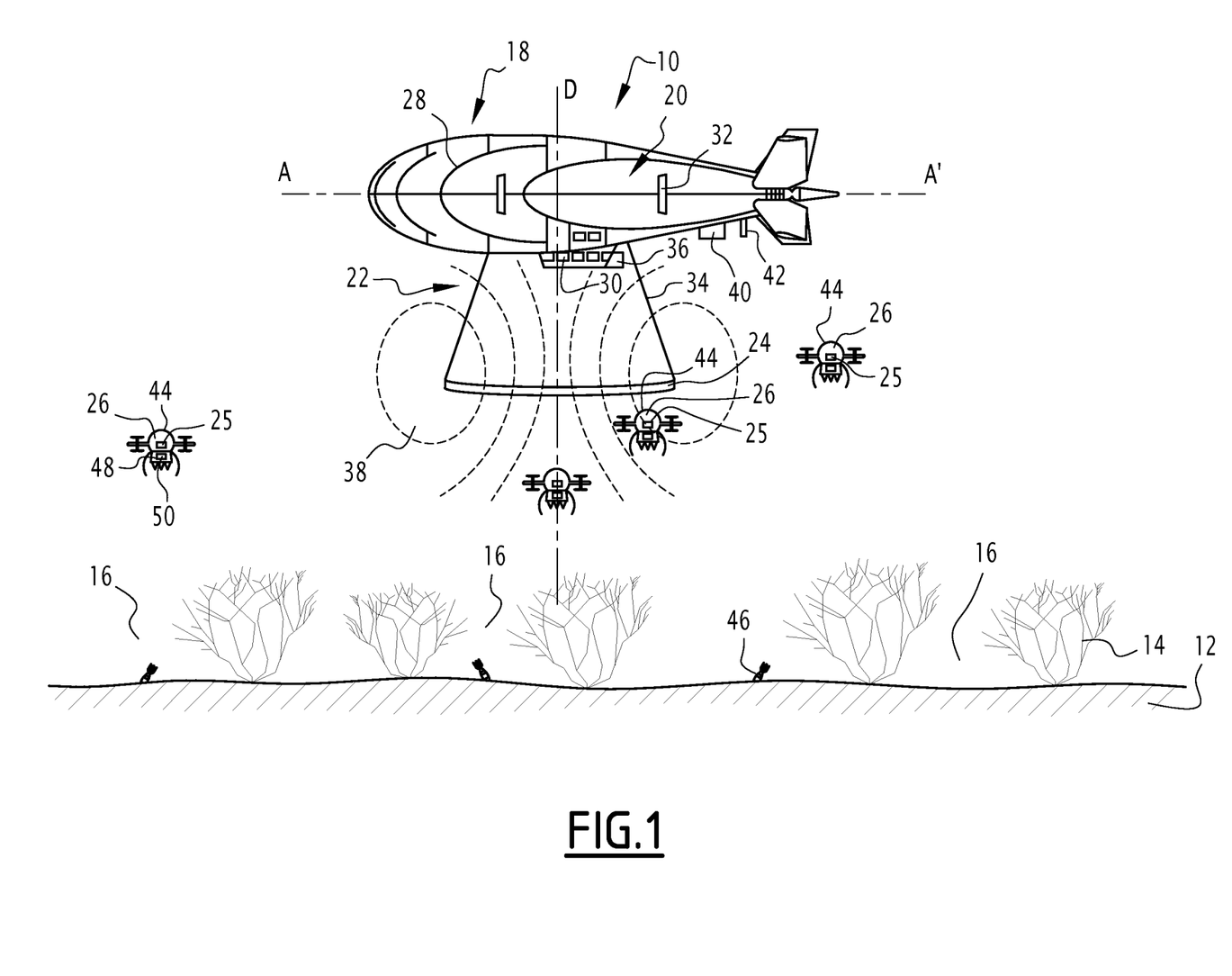
FIG. 1 is a schematic view of an airborne platform according to a first embodiment of the invention.

A first airborne platform 10 configured for flying over a region of interest 12 according to the invention, is shown in FIG. 1.

The region of interest 12 is for example a region having an uneven terrain. The uneven terrain in particular comprises hills, mountains, cliffs or any type of rugged terrain, hot or cold desert area, transition areas, mangrove or coastal areas. The region of interest 12 is for example located on foothills which are difficult to access.

The region of interest 12 may further comprise vegetation 14. The vegetation 14 is for example a forest, in particular a tropical forest. The region of interest 12 here comprises a high density of vegetation, for example trees forming a canopy which covers a majority of the surface of the ground in the region of interest 12.

In the region of interest 12, the vegetation 14 defines a plurality of natural and/or artificial clearings 16.

The clearings 16 are spread in the region of interest, at a distance generally comprised between 100 m and 500 m, preferentially around 300 m, taken along the line of sight between two adjacent clearings 16.

The clearings 16 generally have a surface area greater than 25 $m^2$, at the ground level and generally greater than 200 $m^2$, or even greater than 900 $m^2$ at the top of the canopy.

A clearing 16 is for example defined in a OGP Standard "OGP-Helicopter Guideline for Land Seismic and Helirig operations—Report 420 version 1.1 Jun. 2013.

The subsurface located below the ground comprises layers of geological formation and potentially oil and gas reservoirs.

In order to carry out an exploration or an exploitation of the oil and gas reservoirs, the region of interest 12 comprises at least a base camp and a secondary camp (not represented). The base camp and the secondary camp are separated from a distance generally comprised between 5 km and 20 km, preferentially around 10 km.

The base camp is advantageously accessible by a road. The equipment and necessities are provided to the base camp for example by trucks driving on the road.

The secondary camp is closer from the clearings 16 than the base camp and is not accessible by any road.

The secondary camp and the clearings 16 are separated from a distance generally comprised between 200 m and 10 km, preferentially around 5 km.

The airborne platform 10 is configured to take off from the ground, preferably from the base camp or the secondary camp, to fly in the surrounding air and to land on the ground.

The flight altitude is typically comprised between 50 m and 200 m, for example 150 m.

The speed of the airborne platform 10 is for example comprised between 0 km/h and 30 km/h.

A speed of 0 km/h means that the airborne platform 10 may stay in stationary flight over the region of interest 12.

The airborne platform 10 is for example an airship 18.

As shown in FIG. 1, the airship 18 extends along a longitudinal axis A-A'.

The airship 18 is configured to take-off and land substantially vertically and to move substantially along the longitudinal axis A-A' during the flight.

The airship 18 is configured to carry a payload from the base camp to the secondary camp and, vice versa, from the secondary camp to the base camp.

The airship 18 may also be used to carry the payload from the secondary camp to other clearings 16 and, vice versa, from the clearings 16 to the secondary camp.

The payload transported from the base camp to the secondary camp is for example camp equipment such as tents, water supply, fuel or food. It also comprises equipment for exploration and/or exploitation of oil and gas, such as seismic equipment and/or drilling equipment.

The payload transported from the secondary camp to the base camp is for example camp wastes, or used equipment.

The payload transported from the secondary camp to the clearings 16 is for example seismic equipment for exploration and/or drilling equipment.

The payload may include in some instances an injured or sick worker for medical evacuation.

The airship 18 is configured to carry a payload weighing in particular between 0 ton and 2 tons.

For example, the payload advantageously comprises sensors to carry out measurements. These sensors are, for example, active sensors such as electro-magnetic sensors, laser sensors (LIDAR) or infrared sensors or passive sensors measuring the gravitational field or the magnetic field.

The airborne platform 10 comprises a main body 20 intended to fly over the region of interest 12 and an electrical charging system 22 fixed to the main body 20.

The electrical charging system 22 comprises at least one induction coil 24 intended to remotely charge at least one battery 25 of at least one apparatus 26.

In the example of FIG. 1, the main body 20 comprises a buoyancy enclosure 28, a gondola 30 attached below the buoyancy enclosure 28 along a first direction D, at least one propeller 32 to generate a force, at least one generator (not represented) providing power to the or each propeller 32.

The buoyancy enclosure 28 contains a gas lighter than air, meaning that the gas has a density lower than the surrounding air at 20° C. and 1 atm. The gas is advantageously helium.

When filled with the gas lighter than air, the buoyancy enclosure 28 provides positive buoyancy in air of the airborne platform 10.

The induction coil 24 is fixed below the main body 20 along the first direction D.

Typically, the distance between the induction coil 24 and the main body 20 is comprised between 5 m and 30 m, for example 15 m.

The distance between the induction coil 24 and the main body 20 is chosen by the skilled person to avoid any electronic interaction between the induction coil 24 and the airborne platform 10, especially to avoid electronic interaction with the electronic systems of the airborne platform 10 such as a positioning system.

In a variant, the airborne platform 10 comprises an electromagnetic shield interposed between the induction coil 24 and the main body 20 of the airborne platform 10, and more particularly between the induction coil and the gondola 30 to protect the electronic systems of the airborne platform 10 and people onboard.

Preferably, the induction coil 24 is fixed to the main body 20 by a plurality of slings 34, for example between 3 and 8 slings.

The induction coil 24 extends in a plane substantially perpendicular to the first direction D.

In stationary flight, the first direction D is substantially vertical. Therefore, in stationary flight, the induction coil 24 extends in a plane substantially perpendicular to the vertical.

During the flight of the airborne platform 10, the induction coil 24 may be maintained substantially parallel to the ground or be inclined with regard to the ground.

The induction coil 24 is preferably a loop.

In variant, the induction coil 24 is a square or a rectangle.

For example, the diameter of the induction coil 24 is comprised between 5 m and 30 m, for example 15 m.

The induction coil 24 comprises at least one turn of conductive wire.

Preferably, the induction coil 24 comprises at least one turn of wire.

The section of the conductive wire is preferably comprised between 0.5 mm and 10 mm, for example 1 mm.

The electrical charging system 22 further comprises a power source 36 fixed to the main body 20 for powering the induction coil 24.

The power source 36 for powering the induction coil 24 is for example the power source intended to fly and/or control the main body 20.

In variant, the power source 36 is fixed to the induction coil 24.

In another variant, the power source 36 is fixed to at least one sling 34.

Preferably, the power source 36 is an engine-generator. For example, the engine-generator may run on gasoline, diesel or jet A-1.

The power source 36 injects an electric current in the induction coil to generate a magnetic field 38 by inductive effects.

Preferably, the electrical current injected in the induction coil 24 is comprised between 5 A and 250 A, for example 50 A.

The electrical power of the injection coil 24 is typically comprised between 1 kW and 100 kW.

The apparatus 26 comprises a battery 25 and an induction charger for charging the battery 25 by interaction with the electrical charging system 22 of the airborne platform 10.

The induction charger comprises a reception coil (not represented).

When the apparatus 26 is placed inside the induction coil 24 or at a predetermined distance from the induction coil 24, the reception coil turns the magnetic field 38 generated by the induction coil 24 of the airborne platform 10 into an electric current used for charging the battery 25 of the apparatus 26.

The apparatus 26 may be placed above, under or at a predetermined distance around the induction coil 24.

The predetermined distance depends on the amplitude of the magnetic field 38 generated by the induction coil 24.

The magnetic field 38 generated by the induction coil 24 is proportional to the numbers of turns of wire, the amplitude of the electric current injected in the induction coil 24 and the diameter of the induction coil 24.

Preferably, the apparatus 26 is placed inside the induction coil 24 at a distance comprised between 2 m and 5 m to optimize the charge of the battery 25 of the apparatus 26. For example, the charging system 22 comprises at least one predetermined charging area wherein the apparatus 26 is placed during the charging phase.

Preferably, the charging system 22 comprises a plurality of charging areas, for example circumferentially arranged around the induction coil 24.

The performance of the recharge of the battery 25 of the apparatus 26 varies according to the distance and the alignment between the induction coil 24 and the reception coil of the apparatus 26.

The performance is optimal when the apparatus 26 is closed to the induction coil 24 and the receiver coil is aligned with the induction coil 24, that is to say, when the axis of the receiver coil extends along the first direction D.

Preferably, the airborne platform 10 may comprise a positioning system 40 configured for determining the position of the airborne platform 10 over the region of interest 12 or the position of the induction coil 24 over the region of interest 12.

The airborne platform 10 may further comprise a transmitting device 42 fixed to the main body 20 and intended to send a radio signal comprising at least the determined position.

In variant, the transmitting device 42 is configured for emitting and/or transmitting guiding signals for guiding the airborne platform 10 or the apparatus 26 towards respectively the apparatus 26 or the airborne platform 10.

In the example of FIG. 1, the apparatus 26 is an unmanned airborne vehicle 44.

For exploration purposes of the region of interest, the unmanned airborne vehicle 44 may be used for dropping sensors 46 over the region of interest 12.

To that end, the unmanned airborne vehicle 44 comprises a supporting device 48 for supporting and moving at least one sensor 46 over the region of interest 12.

Each sensor 46 is intended to be partially introduced into the ground through its own velocity, mass and deceleration thereupon its impact with the ground from the unmanned airborne vehicle 44.

The sensor 46 is for example a seismic receiver intended to record vibrations generated by a seismic source and propagating in the ground.

In variant, the unmanned airborne vehicle 44 may be used for monitor at least one part of the region of interest 12 for example using sensors such as cameras, infrared sensors, etc.

In another variant, the unmanned vehicle 44 may be used for acquiring geophysical data such as magnetic data, spectrometric data, etc.

Preferably, the unmanned airborne vehicle 44 comprises a guiding device 50 configured for communicating with the transmitting device 42 of the airborne platform 10. The cooperation between the guiding device 50 of the unmanned airborne vehicle 44 and the transmitting device 42 of the airborne platform 10 ensures a good positioning of the unmanned airborne vehicle 44 with regards to the induction coil 24 of the airborne platform 10 for obtaining a good recharge of the battery 25 of the unmanned airborne vehicle 44.

The guiding device 50 may comprise acoustic sensors and/or optical sensors such as lidar sensors.

Preferably, the unmanned airborne vehicle 44 comprises a battery gauge system configured for moving the unmanned airborne vehicle 44 towards the induction coil 24 when the battery 25 capacity is below a predetermined threshold.

The predetermined threshold is for example comprised between 15% and 30% of the total nominal battery 25 capacity.

The induction coil 24 is configured for simultaneously charging between one and ten unmanned airborne vehicles 44, for example five unmanned airborne vehicles 44.

A method for charging a battery 25 of an apparatus 26 using an airborne platform 10 as mentioned above will now be described.

The method comprise flying the airborne platform 10 over the region of interest 12.

The method further comprises charging the battery 25 of the apparatus 26 by interaction with the electrical charging system 22 of the airborne platform 10.

In reference to the example of FIG. 1, the method preferably comprises moving the airborne platform 10 over the region of interest 12.

The airborne platform 10 is for example maintained at a constant height over the region of interest 12.

For example, the airborne platform 10 follows regular round tours over the region of interest 12.

Then, the method comprises moving the unmanned airborne vehicle 44 inside the induction coil 24 or at a predetermined distance around the induction coil 24 for charging the battery 25 of the unmanned airborne vehicle 44.

As mentioned above, the skilled person is able to determine the optimal predetermined distance for optimizing the recharge of the battery 25 of the unmanned airborne vehicle 44.

Preferably, the unmanned airborne vehicle 44 is maintained at a predetermined distance from the airborne platform 10, that is to say that the unmanned airborne vehicle 44 is substantially immobile with regards to the airborne platform 10.

Then, the unmanned airborne vehicle 44 moves at the same speed and according to the same direction as the airborne platform 10.

Preferably, the method comprises maintaining the unmanned airborne vehicle 44 during a recharge period.

For the moving step and the maintaining step, the transmitting device 42 of the airborne platform 10 and the guiding device 50 of the unmanned airborne vehicle 44 are used to ensure a good positioning of the unmanned airborne vehicle 44 with regard to the induction coil 24.

Advantageously, the method comprises automatically moving the unmanned airborne vehicle 44 towards the induction coil 24 of the airborne platform 10 when the battery 25 capacity of the unmanned airborne vehicle 44 is below the predetermined threshold.

For example, the recharge period is comprised between thirty seconds and fifteen minutes, for example five minutes.

Preferably, after the recharge period, the battery 25 capacity is comprised between 50% and 100% of the total nominal battery 25 capacity.

In a variant, the airborne platform 10 is maintained immobile over the region of interest 12.

For example, in the embodiment of FIG. 1, the airship 18 is maintained in a hover flight over the region of interest 12.

In variant, the airship 18 is restrained by at least one tether attached to the ground and can float freely above the region of interest 12.

Figure 2:
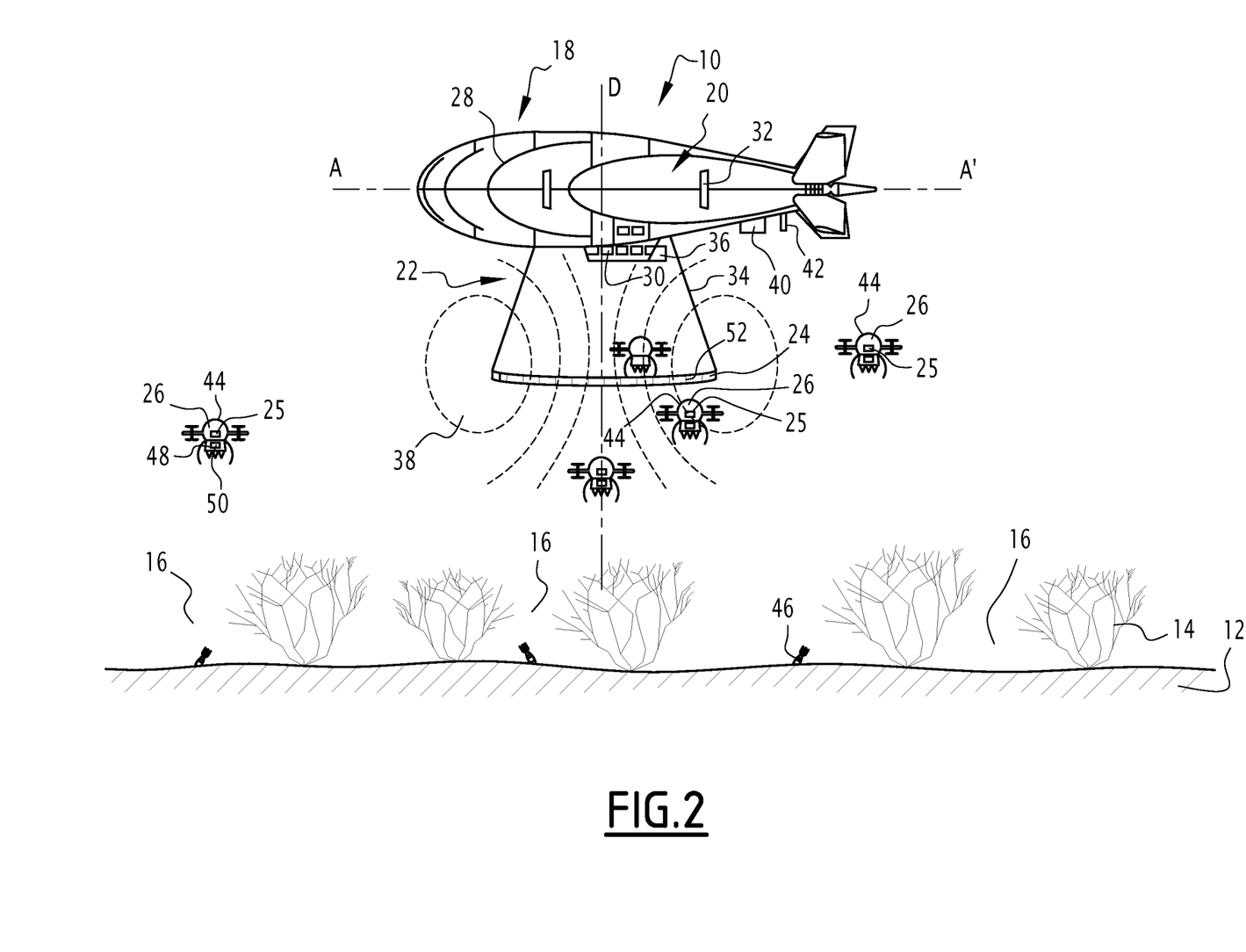
FIG. 2 is schematic view of an electrical charging system of an airborne platform according to a second embodiment of the invention.

FIG. 2 shows a second embodiment of the invention. This embodiment is described by difference with respect to the first embodiment of the invention.

The electrical charging system 24 of the airborne platform 10 further comprises at least one landing area 52 fixed to the main body 20.

Preferably, as visible in FIG. 2, the landing area 52 is a net. Preferably, the landing area 52 is fixed directly on the induction coil 24.

The net 52 is intended to form a landing area for the unmanned airborne vehicle 44.

Therefore, the method for charging the battery 25 of the unmanned airborne vehicle 44 comprises landing the unmanned airborne vehicle 44 on the net 52 before charging the battery 25 of the unmanned airborne platform 44.

This is particularly advantageous since the unmanned airborne vehicle 44 can be turned off during the recharge period. Therefore, here, the recharge period is shorter compared to the recharge period of the first embodiment of the invention.

In a variant, the net 52 is fixed below the induction coil 24 according to the first direction D, or between the main body 20 and the induction coil 24.

Figure 3:
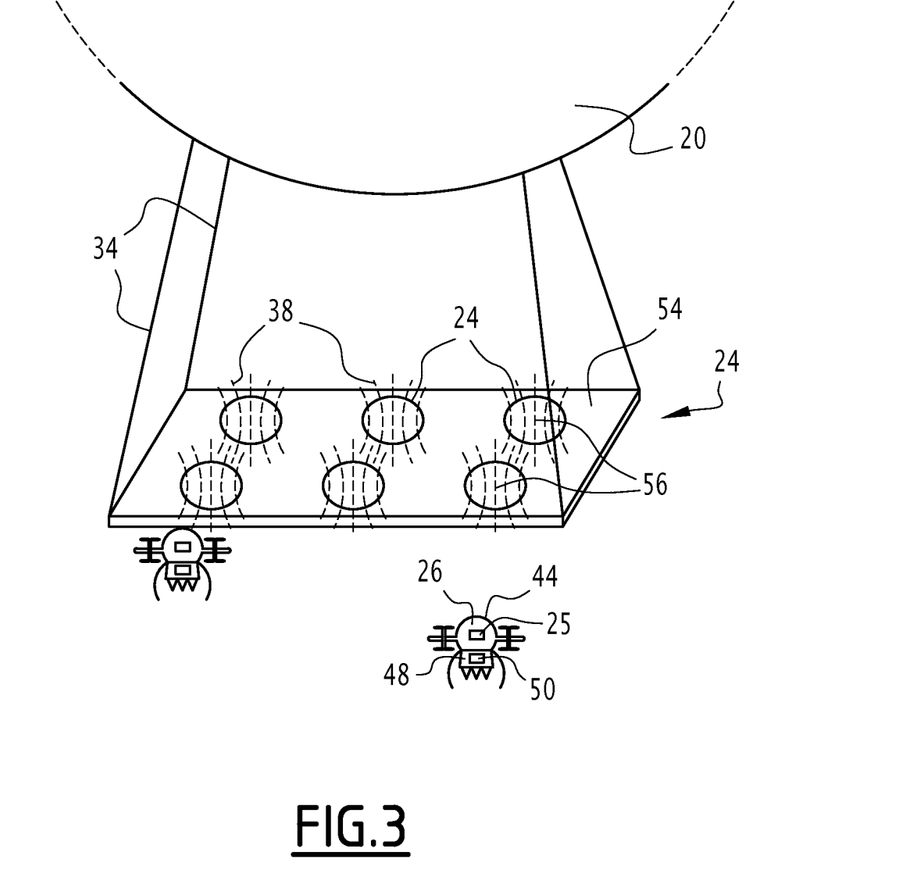
FIG. 3 is a schematic view of an airborne platform according to a third embodiment of the invention.

FIG. 3 shows an airborne platform 10 according to a third embodiment of the invention. This embodiment is described by difference with respect to the first embodiment of the invention.

The electrical charging system 24 comprises a deck 54 fixed to the main body 20.

The deck 54 defines a plurality of through openings 56. Each opening 56 is preferably circular.

The electrical charging system 24 comprises a plurality of induction coils 24 respectively fixed in an interior perimeter of each opening 56.

The plurality of induction coils 24 are connected to the power source 36.

The method for charging the battery 25 of the unmanned airborne vehicle 44 comprises moving at least one unmanned airborne vehicle 44 inside a through opening 56 or below/above the deck 54 at a predetermined distance of the through opening 56.

In a variant, the induction coil 24 is embedded into the deck 54.

In another variant (not represented), the electrical charging system 22 comprises a deck defining a landing surface for the unmanned airborne vehicle 44. The deck does not comprise any through openings 56.

Then, the deck comprises at least one induction coil embedded into the deck for charging the battery 25 of the unmanned airborne vehicles 44.

Figure 4:
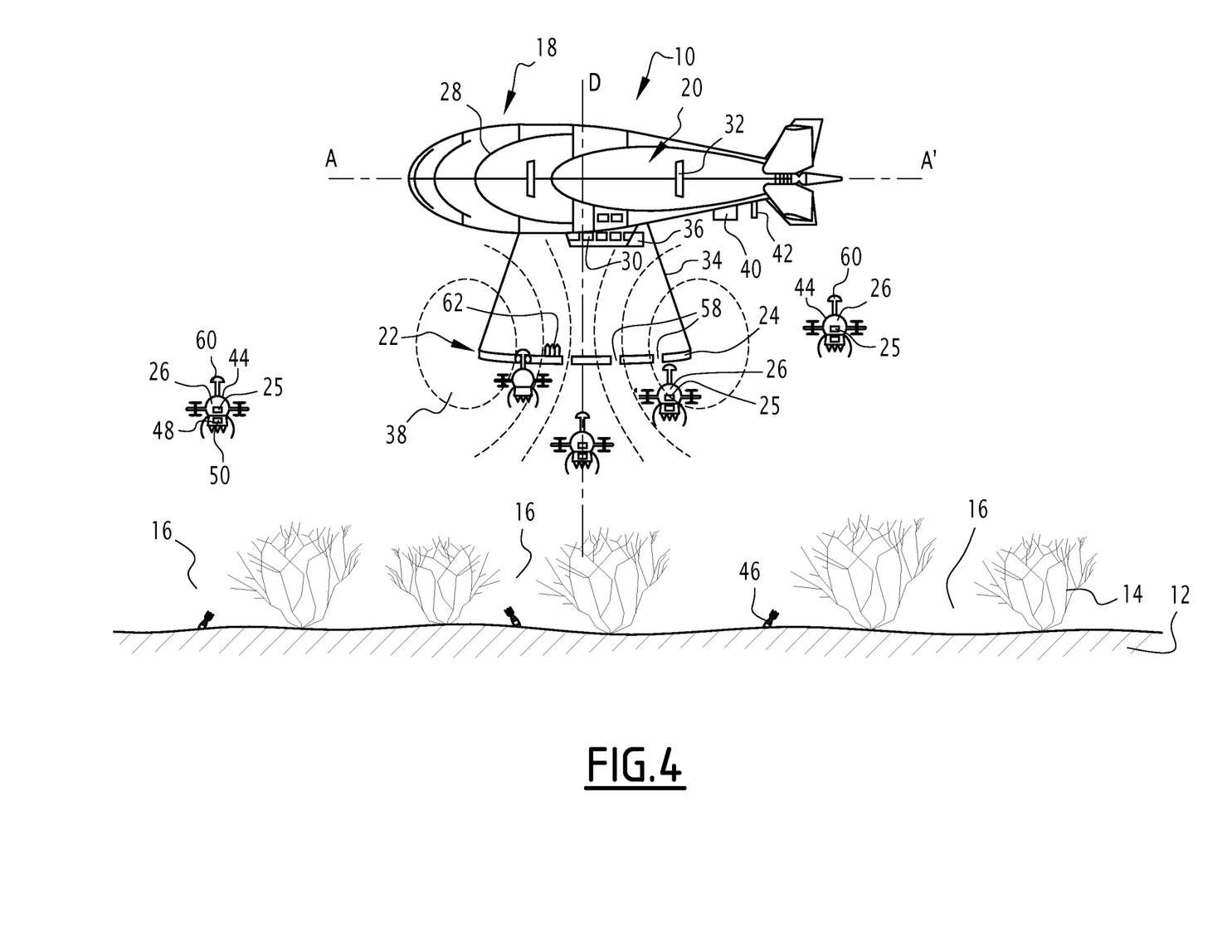
FIG. 4 is a schematic view of an airborne platform according to a fourth embodiment of the invention.

FIG. 4 shows an airborne platform 10 according to a fourth embodiment of the invention. This embodiment is described by difference with respect to the first embodiment.

The electrical charging system 22 comprises at least one hooking device 58. The hooking device 58 being intended to hook the unmanned airborne vehicle 44 to the electrical charging system 22.

For example, the electrical charging system 22 comprises a deck 54 fixed to the main body 20 and located below or above the induction coil 24. In a variant, the induction coil 24 is embedded in the deck 54. The deck 54 comprises at least one hooking device 58.

The unmanned airborne vehicle 44 comprises a fixing member 60, for example a mast fixed onto the unmanned airborne vehicle 44 and intended to cooperate with the hooking device 58 of the electrical charging system 22.

Each hooking device 58 comprises for example at least one retaining latch movable between a retaining position wherein the retaining latch retains an upper end of the fixing member 60, and a free position wherein the retaining latch does not retain the upper end of the fixing member 60. In the free position, the upper end of the fixing member 60 is away from the retaining latch.

The method for charging the battery 25 of the unmanned airborne vehicle 44 comprises hooking the unmanned airborne platform 44 to the hooking device 58 before charging the battery 25 of the unmanned airborne platform 44.

This is particularly advantageous since the unmanned airborne vehicle 44 may be turned off during the recharge of the battery 25. Therefore, the recharge period is shorter compared to a recharge period with an embodiment wherein the unmanned airborne vehicle 44 is maintained in motion during the recharge of the battery 25.

Advantageously, the airborne platform 10 may further comprise a replenishing system 62 intended to replenish the supporting device of the unmanned airborne vehicle 44 with at least one sensor 46.

Figure 5:
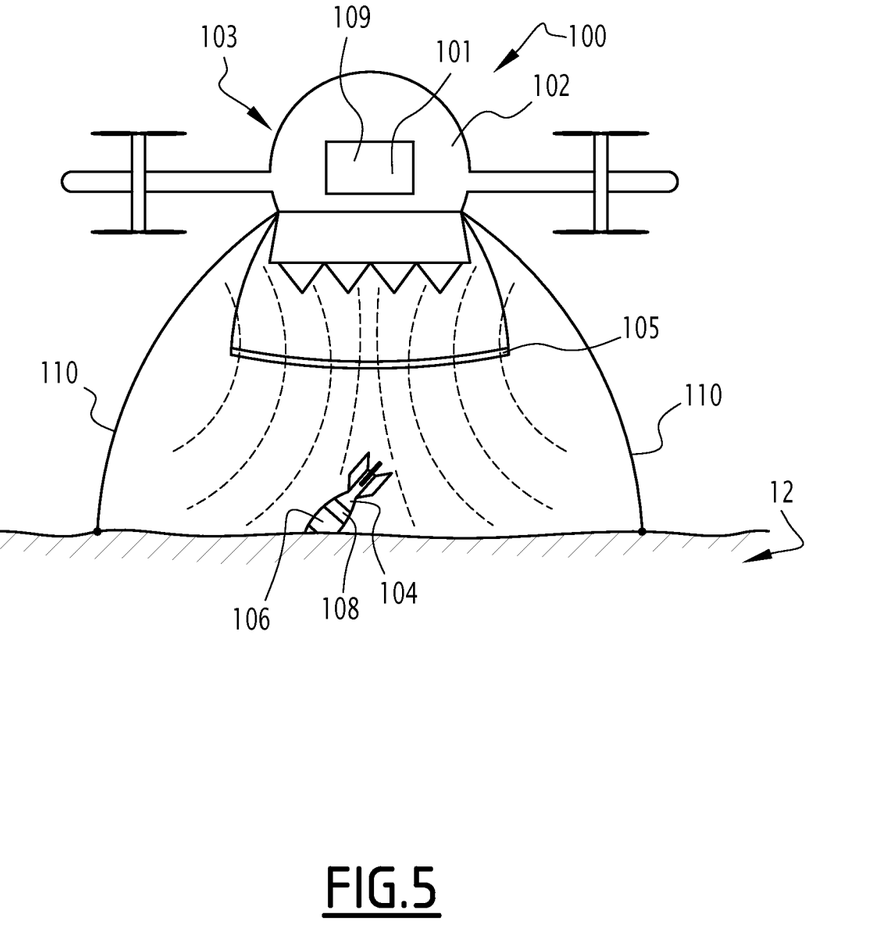
FIG. 5 is a schematic view of an airborne platform according to a fifth embodiment of the invention.

FIG. 5 shows an airborne platform 100 according to a fifth embodiment of the invention. This embodiment is described by difference with respect to the first embodiment of the invention.

In this embodiment, the main body 102 of the airborne platform 100 is an unmanned airborne vehicle 103.

The unmanned airborne vehicle 103 may comprise the features of the unmanned airborne vehicle 44 described in the first embodiment of the invention, and in particular a battery 101.

The unmanned airborne vehicle 103 further comprise an induction coil 105.

The battery 101 is the power source 109 for powering the induction coil 105.

The apparatus 104 is a sensor 106 intended to be pegged in the ground of the region of interest 12 or laid on the ground of the region of interest 12.

The sensor 106 may comprise the features of the sensor 46 described in the first embodiment of the invention.

In particular, the sensor 106 comprises a battery 108.

The unmanned airborne vehicle 103 preferably comprises a plurality of landing legs 110.

The landing legs 110 are in contact with the ground of the region of interest 12.

The landing legs 110 maintain the induction coil 105 at a predetermined distance from the sensor 106.

The induction coil 105 is for example fixed to the main body 102 of the unmanned airborne vehicle 103, preferably beneath the main body 102.

When the unmanned airborne vehicle 103 is landed on the ground, the induction coil 105 is for example disposed above the sensor 106.

In variant, when the unmanned airborne vehicle 103 is landed on the ground, the induction coil 105 is laid on the ground.

The induction coil 105 surrounds the sensor 106.

The method for charging the battery 108 of the sensor 104 comprises landing the unmanned airborne vehicle 103 over the sensor 104 in such way the induction coil 105 is placed over the sensor surrounding the sensor during the recharge period.

In this embodiment, the recharge period is for example comprise between 30 seconds and 5 minutes, for example 3 minutes.

In a variant, the unmanned airborne vehicle 103 is maintained at a predetermined distance from the ground over the sensor 106. The unmanned airborne 103 is maintained in a hover flight during the recharge period.

Figure 6:
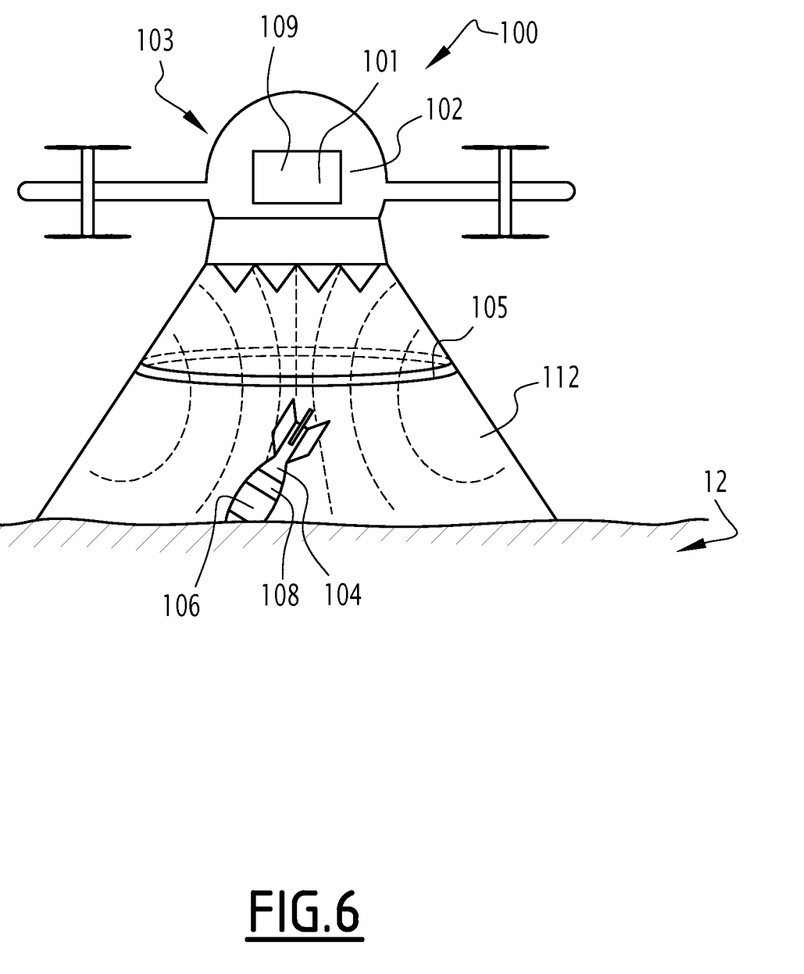
FIG. 6 is a schematic view of an airborne platform according to a sixth embodiment of the invention.

FIG. 6 shows an airborne platform 100 according to a sixth embodiment of the invention. This embodiment is described by difference with respect to the fifth embodiment of the invention.

In this embodiment, the unmanned airborne vehicle 103 comprises a framework 112 fixed below the main body 102 and intended to be in contact with the ground of the region of interest 12.

The framework 112 forms a supporting element for the unmanned airborne vehicle 103 when landed on the ground of the region of interest 12.

The framework 112 is intended to cover the sensor 104 during the recharge period.

For example, the framework 112 has a hemispheric shape or a truncated cone shape.

The induction coil 105 is fixed to the framework 112 on an internal surface of the framework or on an external surface of the framework 112.

In variant, the induction coil 105 is embedded in the framework 112.

Advantageously, for the fifth and sixth embodiments of the invention, the sensor 106 comprises an emitting device configured for emitting a radio signal or a light signal towards the airborne platform 100 for signaling that the battery 108 is under the threshold and requires a recharge of its battery 108.

Then, the airborne platform 100 comprises a receiving device configured for receiving the radio signal or the light signal. The airborne platform 100 is guided to the sensor 106 requiring a recharge of its battery 108.

A seventh embodiment of the invention (not shown) is described by difference with respect to the first embodiment.

In this embodiment, the apparatus is an unmanned ground vehicle.

For example, the unmanned ground vehicle is intended to peg and/or to collect sensors to or from the ground.

The sensors are for example seismic sensors as described in the second embodiment of the invention.

In a variant, the unmanned ground vehicle is intended to measure a geophysical parameter of the ground such as the magnetic field, the electrical conductivity, etc.

In this embodiment, the airborne platform 10, such as the airship 18 is moved towards the unmanned ground vehicle to charge the battery of the unmanned ground vehicle.

Preferably, during the charging phase, the unmanned ground vehicle stands still on the ground.

The invention claimed is:

1. An airborne platform comprising a main body configured for flying over a region of interest and an electrical charging system fixed to the main body and located outside of the main body, the electrical charging system comprising at least one induction coil intended to remotely charge at least one battery of at least one apparatus, wherein the induction coil is fixed below the main body along a first direction, extends in a plane substantially perpendicular to the first direction, and is fixed to the main body by a plurality of slings.

2. The airborne platform according to claim 1, wherein the electrical charging system comprises a power source fixed to the main body or to the induction coil for powering the induction coil.

3. An assembly comprising:
an airborne platform according to any one of claim 1,
at least one apparatus comprising at least one battery.

4. The assembly according to claim 3, wherein the apparatus is an unmanned airborne vehicle further comprising an induction charger for charging the battery by interaction with the electrical charging system of the airborne platform.

5. The assembly according to claim 3, wherein the apparatus is a sensor intended to be pegged in a ground of the region of interest or laid on a ground of the region of interest, the sensor further comprising an induction charger for charging the battery by interaction with the electrical charging system of the airborne platform.

6. The assembly according to claim 3, wherein the apparatus comprising the at least one battery is independently moveable from the airborne platform.

7. A method for charging a battery of an apparatus using an airborne platform, the airborne platform comprising a main body and an electrical charging system fixed to the main body, the electrical charging system comprising at least one induction coil, wherein the induction coil is fixed below the main body along a first direction, extends in a plane substantially perpendicular to the first direction, and is fixed to the main body by a plurality of slings, the method comprising:
flying the airborne platform over the region of interest,
charging the battery of the apparatus using the induction coil.

8. The method according to claim 7, comprising moving the airborne platform over the region of interest or maintaining the airborne platform in a hover flight over the region of interest.

9. The method according to claim 7, wherein the apparatus is an unmanned airborne vehicle, the method comprising moving the unmanned airborne vehicle inside the induction coil or at a predetermined distance around the induction coil for charging the battery of the unmanned airborne vehicle.

10. The method according to claim 7, comprising maintaining the unmanned airborne vehicle at a predetermined distance from the airborne platform.

11. The method according to claim 7, wherein the apparatus is an unmanned airborne vehicle, the electrical charging system comprising a landing area fixed below the main body or below the induction coil, the method further comprising landing the unmanned airborne platform on the landing area before charging the battery of the unmanned airborne platform.

12. The method according to claim 7, wherein the apparatus is a sensor pegged in the ground of the region of interest or laid on the region of interest, the method further comprising landing the airborne platform over the sensor or maintaining the airborne platform at a predetermined distance from the sensor.

13. The method according to claim 7, wherein the apparatus is an unmanned airborne vehicle, the electrical charging system comprising at least one hooking device, the method further comprises hooking the unmanned airborne vehicle to the hooking device before charging the battery of the unmanned airborne vehicle.

14. The method according to claim 13, further comprising, during charging the battery of the unmanned airborne vehicle, replenishing the unmanned airborne vehicle with at least one sensor.

15. An airborne platform comprising a main body configured for flying over a region of interest and an electrical charging system fixed to the main body and located outside of the main body, the electrical charging system comprising at least one induction coil intended to remotely charge at least one battery of at least one apparatus,
wherein the apparatus is an unmanned airborne vehicle, and
wherein the unmanned airborne vehicle comprises a supporting device for carrying at least one sensor intended to be dropped from the unmanned airborne vehicle, the unmanned airborne vehicle further comprising a replenishing system intended to replenish the supporting device of the unmanned airborne vehicle with at least one sensor.

16. The airborne platform according to claim 15, wherein the main body is an airship.

17. The airborne platform according to claim 15, wherein the electrical charging system comprises a landing area for the unmanned airborne vehicle, said landing area being fixed to the induction coil.

18. The airborne platform according to claim 15, wherein the electrical charging system comprises at least one hooking device, the hooking device being intended to hook the unmanned airborne vehicle to the electrical charging system.

19. An airborne platform comprising a main body configured for flying over a region of interest and an electrical charging system fixed to the main body and located outside of the main body, the electrical charging system comprising at least one induction coil intended to remotely charge at least one battery of at least one apparatus, wherein the apparatus is a sensor intended to be pegged in a ground of the region of interest or laid on a ground of the region of interest.

20. The airborne platform according to claim 19, further comprising a plurality of landing legs, the landing legs being intended to be in contact with the ground of the region of interest and to maintain the induction coil at a predetermined distance from the sensor.

21. The airborne platform according to claim 19, wherein the electrical charging system comprises a framework fixed below the main body and intended to be in contact with the ground of the region of interest, the induction coil being fixed to the framework or embedded in the framework, the framework being intended to cover the sensor.

\* \* \* \* \*